(12) United States Patent
Stand et al.

(10) Patent No.: US 10,377,945 B2
(45) Date of Patent: Aug. 13, 2019

(54) MIXED HALIDE SCINTILLATORS FOR RADIATION DETECTION

(71) Applicant: University of Tennessee Research Foundation, Knoxville, TN (US)

(72) Inventors: Luis Stand, Knoxville, TN (US); Charles L. Melcher, Oak Ridge, TN (US); Mariya Zhuravleva, Knoxville, TN (US); Hua Wei, Knoxville, TN (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 279 days.

(21) Appl. No.: 15/309,172

(22) PCT Filed: May 8, 2015

(86) PCT No.: PCT/US2015/029895
§ 371 (c)(1),
(2) Date: Nov. 4, 2016

(87) PCT Pub. No.: WO2015/172026
PCT Pub. Date: Nov. 12, 2015

(65) Prior Publication Data
US 2017/0058196 A1 Mar. 2, 2017

Related U.S. Application Data

(60) Provisional application No. 61/990,541, filed on May 8, 2014.

(51) Int. Cl.
| | | |
|---|---|---|
| G21K 4/00 | (2006.01) | |
| C09K 11/62 | (2006.01) | |
| C09K 11/77 | (2006.01) | |
| G01T 1/202 | (2006.01) | |

(52) U.S. Cl.
CPC ........ C09K 11/7733 (2013.01); C09K 11/628 (2013.01); C09K 11/7705 (2013.01); G01T 1/2023 (2013.01); G21K 4/00 (2013.01)

(58) Field of Classification Search
CPC ............ C09K 11/7733; C09K 11/7705; C09K 11/628; G01T 1/2023; G21K 4/00
See application file for complete search history.

(56) References Cited

U.S. PATENT DOCUMENTS

| | | | |
|---|---|---|---|
| 4,057,508 A | 11/1977 | Wolfe et al. | |
| 4,138,529 A | 2/1979 | Mori et al. | |
| 2011/0165422 A1 | 7/2011 | Gundiah et al. | |
| 2012/0193539 A1* | 8/2012 | Bizarri | C09K 11/7733 250/361 R |
| 2012/0273726 A1* | 11/2012 | Zhuravleva | C09K 11/7733 252/301.4 H |

FOREIGN PATENT DOCUMENTS

| | | |
|---|---|---|
| BE | 1016045 | 2/2006 |
| EP | 0533236 | 3/1993 |
| EP | 1548086 | 6/2005 |
| EP | 1903089 | 3/2008 |

OTHER PUBLICATIONS

International Search Report and Written Opinion, dated Sep. 16, 2015, from International Application No. PCT/US2015/029895, filed May 8, 2015.
Bizarri et al., "Scintillation and Optical Properties of BaBrI: Eu2+ and CsBa2I5: Eu2+", IEEE Transactions on Nuclear Science, vol. 58, No. 6, Dec. 2011, pp. 3403-3410.
Bollinger et al., "Measurement of the Time Dependence of Scintillation Intensity by a Delayed-Coincidence Method", The Review of Scientific Instruments, vol. 32, No. 9, Sep. 1961, pp. 1044-1050.
Dorenbos, "Energy of the first 4f7—> 4f65d transition of Eu2+ in inorganic compounds", Journal of Luminescence 104, Feb. 2003, pp. 239-260.
Gahane et al., "Luminescence of Eu2+ in some iodides", Optical Materials 32, Jun. 2009, pp. 18-21.
Gascon et al., "Scintillation properties of CsBa2I5 activated with monovalent ions Tl+, Na+ and In+", Journal of Luminescence 156, Aug. 2014, pp. 63-68.
Gektin et al., "Scintillation Efficiency Improvement by Mixed Crystal Use", IEEE Transactions on Nuclear Science, vol. 61, No. 1, Feb. 2014, pp. 262-270.
Payne et al., "Nonproportionality of Scintillator Detectors: Theory and Experiment", IEEE Transactions on Nuclear Science, vol. 56, No. 4, Aug. 2009, pp. 2506-2512.
Rooney et al., "Scintillator Light Yield Nonproportionality: Calculating Photon Response Using Measured Electron Response", IEEE Transactions on Nuclear Science, vol. 44, No. 3, Jun. 1997, pp. 509-516.
Shirwadkar et al., "New promising scintillators for gamma-ray spectroscopy: Cs(Ba,Sr)(Br,I)3", IEEE Nuclear Science Symposium Conference Record, Oct. 23-29, 2011, pp. 1583-1585.
Wei et al., "Scintillation Properties of Cs3LaCl6:Ce3+ and Cs3LaBr6:Ce3+", IEEE Transactions on Nuclear Science, vol. 61, No. 1, Feb. 2014, pp. 390-396.

(Continued)

Primary Examiner — C Melissa Koslow
(74) Attorney, Agent, or Firm — Hunton Andrews Kurth LLP

(57) ABSTRACT

Mixed halide scintillation materials of the general formula $AB_{(1-y)}M_y X'_w X''_{(3-w)}$, where $0 \leq y \leq 1$, $0.05 \leq w \leq 1$, A may be an alkali metal, B may be an alkali earth metal, and X' and X'' may be two different halogen atoms, and of the general formula $A_{(1-y)}BM_y X'_w X''_{(3-w)}$, where $0 \leq y \leq 1$, $0.05 \leq w \leq 1$, A maybe an alkali metal, B may be an alkali earth metal, and X' and X'' are two different halogen atoms. The scintillation materials of formula (1) include a divalent external activator, M, such as $Eu^{2+}$ or $Yb^{2+}$. The scintillation materials of formula (2) include a monovalent external activator, M, such as $Tl^+$, $Na^+$ and $In^+$.

3 Claims, 23 Drawing Sheets

(56) References Cited

OTHER PUBLICATIONS

Wei et al., "The scintillation properties of CeBr3_xClx single crystals", Journal of Luminescence 156, Aug. 2014, pp. 175-179.

Wei et al., "Two new cerium-doped mixed-anion elpasolite scintillators: Cs2NaYBr3I3 and Cs2NaLaBr3I3", Optical Materials 38, Oct. 2014, pp. 154-160.

Yang et al., "Crystal growth and characterization of CsSr1_xEuxl3 high light yield scintillators", Phys. Status Solidi RRL 5, No. 1, 43-45 (2011) / DOI:10.1002/pssr.201004434 (published online Dec. 7, 2010).

Yang et al., "Optical and Scintillation Properties of Single Crystal CsSr1_xEuxl3", Nuclear Science Symposium Conference Record (NSS/MIC), 2010 IEEE, Oct. 30-Nov. 6, 2010.

Zhuravleva et al., "New single crystal scintillators: CsCaCl3:Eu and CsCaI3:Eu", Journal of Crystal Growth 352, Feb. 2012, pp. 115-119.

\* cited by examiner

MIXED HALIDE SCINTILLATORS FOR RADIATION DETECTION

CROSS REFERENCE TO RELATED APPLICATIONS

The present application is a national phase application based on International Application No. PCT/US2015/029895, filed May 8, 2015, and claims the benefit of U.S. Provisional Application, Ser. No. 61/990,541, filed May 8, 2014, entitled "MIXED HALIDE SCINTILLATORS FOR RADIATION DETECTION," the disclosure of which is incorporated herein by reference in its entirety.

FIELD OF THE INVENTION

The present invention is related to scintillation materials used to detect radiation such as X-rays, gamma rays, and thermal neutron radiation.

BACKGROUND

A scintillator is a material that can absorb high-energy particles and convert these particles to multiple low-energy photons. Scintillation materials are scientifically and economically significant in conjunction with photodetectors to detect high-energy photons, electrons and other particles in various applications, which include medical imaging, geological exploration, homeland security, and high-energy physics. In order to maximize the scintillator's values in the applications, characteristics including high scintillation light yield, fast scintillation decay time and rise time, good energy resolution, high degree of proportionality, proper emission wavelength, and good thermal response over a wide temperature range are desired. To these ends, it is important to obtain electron/hole traps and defect free scintillators.

Halide scintillators that contain a monovalent or a divalent external activator are a promising class of scintillators. Monovalent external activators include $Tl^+$, $Na^+$ and $In^+$. For example, $CsBa_2I_5$ doped with $Tl^+$, $Na^+$ and $In^+$ scintillators are manufactured and used as gamma-ray detectors in "Scintillation Properties of $CsBa_2I_5$ Activated with Monovalent Ions $Tl^+$, $Na^+$ and $In^+$," by M. Gascón, et al., *Journal of Luminescence*, 2014, 156, 63-68. $Eu^{2+}$ and $Yb^{2+}$ are examples of divalent external activators. Several $Eu^{2+}$-doped halide scintillators showing a high light output and melting congruently, which allows the scintillators to be grown using the Bridgman-Stockbarger technique, have been described. For example, $Eu^{2+}$-doped $CsSrI_3$ scintillators are prepared and their photophysical properties are disclosed in "Crystal Growth and Characterization of $CsSr_{1-x}Eu_xI_3$ High Light Yield Scintillators," by K. Yang, et al., *Rapid Research Letters*, 2011, 5, 43-45 and in "Optical and Scintillation Properties of Single Crystal CsSrI-xEuxI3," by K. Yang, et al., *Nuclear Science Symposium Conference Record (NSS/MIC)*, 2010IEEE2010, 1603-1606. U.S. Patent Pub. No. 2012/0273726 by M. Zhuravleva, et al. reported the scintillation properties of $CsSrBr_3$ doped with $Eu^{2+}$. Another example, "New Single Crystal Scintillators, $CsCaCl_3$: Eu and $CsCaI_3$: Eu," by M. Zhuravleva, et al., *Journal of Crystal Growth*, 2012, 352, 115-119, described the scintillation properties of $CsCaI_3$ and $CsCaCl_3$ doped with $Eu^{2+}$. Scintillator crystals of $CsBaI_3$ doped with $Eu^{2+}$ were found to have excellent scintillator properties as disclosed in "New Promising Scintillators for Gamma-Ray Spectroscopy: $Cs(Ba,Sr)(Br,I)_3$," by U. Shirwadkar, et al., *IEEE Nuclear Science Symposium Conference Record*, 2011, 1583-1585.

The use of mixed-halide scintillators, i.e., scintillators containing two or more different halide atoms, has been proposed as a means of increasing scintillator light output as shown in "Scintillation Efficiency Improvement by Mixed Crystal Use," by A. V. Gektin, et al., *IEEE Transactions on Nuclear Science*, 2014, 61, 262-270. Mixed-halide scintillators have been exemplified in limited contexts. For example, mixed-halide elpasolite scintillators of $Cs_2NaYBr_3I_3$ and $Cs_2NaLaBr_3I_3$ doped with the trivalent activator $Ce^{3+}$ are fabricated and their optical properties reported in "Two New Cerium-Doped Mixed-Anion Elpasolite Scintillators: $Cs_2NaYBr_3I_3$ and $Cs_2NaLaBr_3I_3$," by H. Wei, et al., *Optical Materials*, 2014, 38, 154-160. $Ce^{3+}$-based single crystal mixed-halide scintillators are reported in "The Scintillation Properties of $CeBr_{3-x}Cl_x$ Single Crystals," by H. Wei, et al., *Journal of Luminescence*, 2014, 156, 175-179. In another example, in "Scintillation and Optical Properties of $BaBrI:Eu^{2+}$ and $CsBa_2I_5:Eu^{2+}$," *IEEE Transactions on Nuclear Science*, 2011, 58, 3403-3410, G. Bizarri, et al. reported $Eu^{2+}$-doped scintillators of BaBrI.

DETAILED DESCRIPTION

Figure 1:
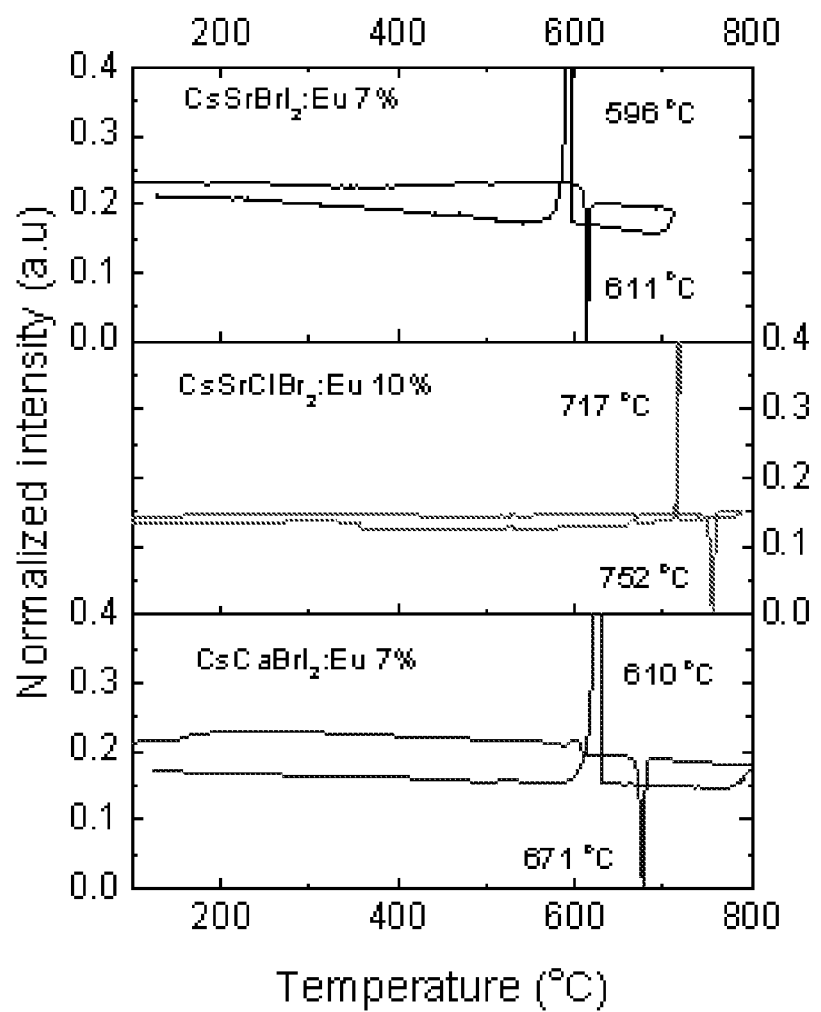
FIG. 1 illustrates differential scanning calorimetry thermograms for an exemplary $CsSrBrI_2$ (Eu 7%) scintillator, an exemplary $CsSrClBr_2$ (Eu 10%) scintillator, and an exemplary $CsCaBrI_2$ (Eu 7%) scintillator.

The present disclosure is directed to a group of newly discovered mixed-halide scintillator compounds. These scintillators possess excellent scintillator properties, such as high energy resolution and high light output.

Mixed-halide scintillators according to embodiments of the invention may include two families with the following general exemplary formulas:

$$AB_{(1-y)}M_yX'_wX''_{(3-w)} \quad (1)$$

and

$$A_{(1-y)}BM_yX'_wX''_{(3-w)} \quad (2)$$

where 0≤y≤1, and 0.05≤w≤1.

The scintillators of the formulas may include a monovalent or divalent external activator. In the formula (1), M may include a divalent external activator (such as Eu or Yb); A may include an alkali metal (such as Li, Na, K, Rb, Cs), indium (In), or any combination thereof; B may include an alkali earth metal (such as Mg, Ca, Sr, Ba, or any combination thereof); and X' and X" are two different halogen atoms (such as F, Cl, Br, I) or any combination thereof.

The scintillators of formula (2) include a monovalent external activator. In the formula (2), M may include a monovalent external activator, such as In, Na, or Tl; A may include an alkali metal (such as Li, Na, K, Rb, Cs), indium (In), or any combination thereof; B may include an alkali earth metal (such as Mg, Ca, Sr, Ba), or any combination thereof; and X' and X" are two different halogen atoms (such as F, Cl, Br, I), or any combination thereof.

The compounds of formulas (1) and (2) can form excellent scintillators. These new scintillators may be suitable for radiation detection applications including medical imaging, homeland security, high energy physics experiments, and geophysical exploration. These scintillators are particularly notable for their high light output, excellent energy resolution, congruent melting, and practical crystal growth.

Embodiments of methods of making the mixed halide scintillators are now described. According to one embodiment, anhydrous high purity starting materials from Sigma-Aldrich were hand mixed in stoichiometric ratio according to the chemical formulas of the respective compounds and loaded into clean quartz ampoules. The mixing and loading were done in a dry glove box with moisture and oxygen content of less than 0.01 ppm.

The starting materials were subsequently dried in the quartz ampoule under 10$^{-6}$ torr vacuum at 200° C. for 4 hours, cooled down to room temperature, and sealed inside of the quartz ampoule under vacuum with a hydrogen/oxygen torch. A single zone furnace may be used to melt and synthesize compounds of formulas (1) and (2), but it shall be appreciated that other furnaces, including without limitation a two zone transparent furnace and a three zone vertical Bridgman furnace, may be used.

In this embodiment, the melt and synthesis temperature was raised to 20° C. above the highest melting temperature of the starting materials used. This temperature was held for 7 hours and cooled down to room temperature in 7 hours. The ampoule was inverted and the procedure above was repeated to encourage complete mixing and reacting of all starting materials. This resulted in polycrystalline samples. The synthesis techniques including without limitation, Bridgman method, electronic dynamic gradient method, Czochralski method, micro-pulling down method, thin film deposition, melt-freezing, and ceramic hot pressing may be used to produce the final product in poly-crystal, single crystal, thin film and ceramic forms.

According to another embodiment, the starting material may be mixed using a multiple ampoule alternating ("MAA") mixing process. MAA mixing is a multiple melt-mixing process in which the ampoule's orientation in a vertical furnace is inverted one time, or several times, in order to facilitate uniform mixing of all starting materials for chemical reactions. MAA mixing provides for a more homogeneous distribution of starting materials and improved mixture transparency. The number of inversions employed in an MAA mixing process may be determined by a variety of factors including, for example, the particular starting materials, intended chemical reactions, form of the resultant product, and temperature. Additional detail on multiple ampoule alternating mixing methods is presented by Wei et al. in "Scintillation Properties of Cs$_3$LaCl$_6$: Ce$^{3+}$ and Cs$_3$LaBr$_6$:Ce$^{3+}$," *IEEE Transactions on Nuclear Science*, 2014, 61, 390-396, the disclosure of which is incorporated herein by reference.

Exemplary mixed-halide scintillators according to the present disclosure include crystals of formulas (1) and (2). Scintillation properties of several of these exemplary scintillators are presented in Table I below.

TABLE I

Scintillation Properties of Exemplary Scintillators

| Composition | Light Yield (ph/MeV) | Radioluminescence Peak (nm) | Energy Resolution (at 662 KeV) | Scintillation Decay (µs) |
|---|---|---|---|---|
| CsSrBrI$_2$ (7% Eu) | 60,000 | 455 | 3.5% | 0.7 (~85%) |

TABLE I-continued

Scintillation Properties of Exemplary Scintillators

| Composition | Light Yield (ph/MeV) | Radioluminescence Peak (nm) | Energy Resolution (at 662 KeV) | Scintillation Decay (µs) |
|---|---|---|---|---|
| $CsCaBrI_2$ (7% Eu) | 50,000 | 462 | 5.0% | 1.2 (~90%) |
| $CsSrClBr_2$ (10% Eu) | 35,000 | 445 | 5.0% | 2.5 (~95%) |
| $CsCaBrI_2$ (3% Eu) | ~35,000 | | 5.9% | |
| $CsSrBrCl_2$ (10% Eu) | ~32,000 | | 8.7% | |
| $CsSrICl_2$ (10% Eu) | ~30,000 | | | |
| $CsSrClI_2$ (7% Eu) | ~40,000 | | | |
| $KSrBrI_2$ (Eu 3%) | ~36,500 | 460 | | 1.8 |
| $RbSrBrI_2$ (Eu 3%) | ~37,200 | 453 | | 1.7 (~68%) |
| $CsSrBrI_2$ (Yb 1%) | ~22,000 | 453 | | 1.9 (~54%) |
| $CsSrBrI_2$ (In 0.5%) | ~4,000 | 530 | | |

Differential Scanning Calorimetry of Exemplary Scintillators

The melting points and crystallization points for exemplary scintillators were measured using a Setaram Labsys Evo Differential Scanning calorimeter (DSC). Samples were heated and cooled at 5° K/min between 25° C. and 800° C. under flowing ultra-high purity argon gas. DSC data from several exemplary scintillators is presented in FIG. 1.

FIG. 1 presents DSC data measured for an exemplary $CsSrBrI_2$ scintillator (Eu 7%), an exemplary $CsSrClBr_2$ scintillator (Eu 10%), and an exemplary $CsCaBrI_2$ scintillator (Eu 7%). As shown in this figure, the DSC curve of the $CsSrBrI_2$ (Eu 7%) scintillator indicates the melting temperature is 611° C., the DSC curve of the $CsSrClBr_2$ (Eu 10%) scintillator indicates that the melting temperature is 752° C., and DSC curve of the $CsCaBrI_2$ (Eu 7%) scintillator indicates that the melting temperature is 671° C.

Crystal Growth of Exemplary Scintillators

Figure 2A:
FIG. 2A illustrates the crystal growth of an exemplary $CsSrBrI_2$ (Eu 7%) scintillator in the ampoule.
Figure 2B:
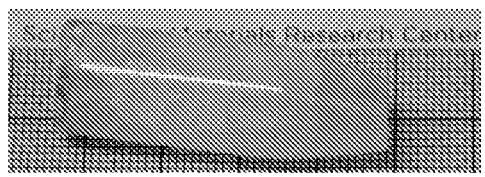
FIG. 2B illustrates a bare crystal of an exemplary $CsSrBrI_2$ (Eu 7%) scintillator.
Figure 2C:
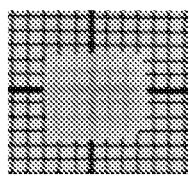
FIG. 2C illustrates a 5×5×5 mm³ polished sample of an exemplary $CsSrBrI_2$ (Eu 7%) scintillator.

Crystal growth of an exemplary $CsSrBrI_2$ (Eu 7%) scintillator is shown in FIGS. 2A to 2C. In FIG. 2A the crystal growth of the $CsSrBrI_2$ scintillator (Eu 7%) in the ampoule is shown. FIG. 2B illustrates a bare crystal of an exemplary $CsSrBrI_2$ scintillator (Eu 7%). FIG. 2C illustrates a 5×5×5 mm³ polished sample of an exemplary $CsSrBrI_2$ scintillator (Eu 7%).

Figure 3A:
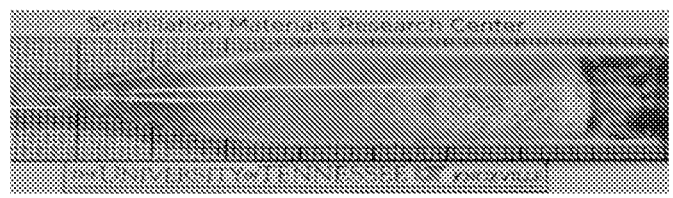
FIG. 3A illustrates the crystal growth of an exemplary $CsCaBrI_2$ (Eu 7%) scintillator in the ampoule.
Figure 3B:
FIG. 3B illustrates a bare crystal of an exemplary $CsCaBrI_2$ (Eu 7%) scintillator.
Figure 3C:
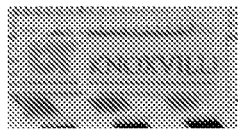
FIG. 3C illustrates an 8×8×20 mm³ polished sample of an exemplary $CsCaBrI_2$ (Eu 7%) scintillator.

FIGS. 3A to 3C show the crystal growth of an exemplary $CsCaBrI_2$ (Eu 7%) scintillator. In FIG. 3A the crystal growth of an exemplary $CsCaBrI_2$ scintillator (Eu 7%) in the ampoule is shown. FIG. 3B illustrates a bare crystal of an exemplary $CsCaBrI_2$ scintillator. FIG. 3C illustrates an 8×8×20 mm³ polished sample of an exemplary $CsCaBrI_2$ scintillator (Eu 7%).

Figure 4A:
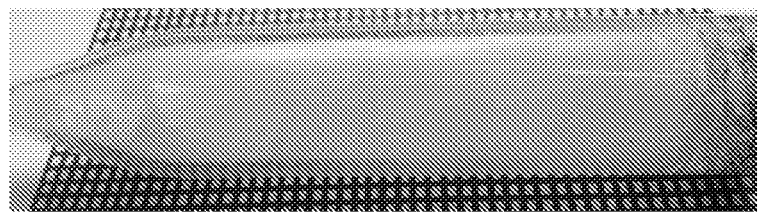
FIG. 4A illustrates the crystal growth of an exemplary $CsSrClBr_2$ (Eu 10%) scintillator in an ampoule.
Figure 4B:
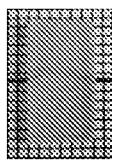
FIG. 4B illustrates a 6×5×13 mm³ polished sample of an exemplary $CsSrClBr_2$ (Eu 10%) scintillator.

FIGS. 4A and 4B show the crystal growth of an exemplary $CsSrClBr_2$ (Eu 10%) scintillator. FIG. 4A illustrates the crystal growth of an exemplary $CsSrClBr_2$ scintillator (Eu 10%) in an ampoule, and FIG. 4B illustrates a 6×5×13 mm³ polished sample of an exemplary $CsSrClBr_2$ scintillator (Eu 10%).

Radioluminescence of Exemplary Scintillators

Figure 5:
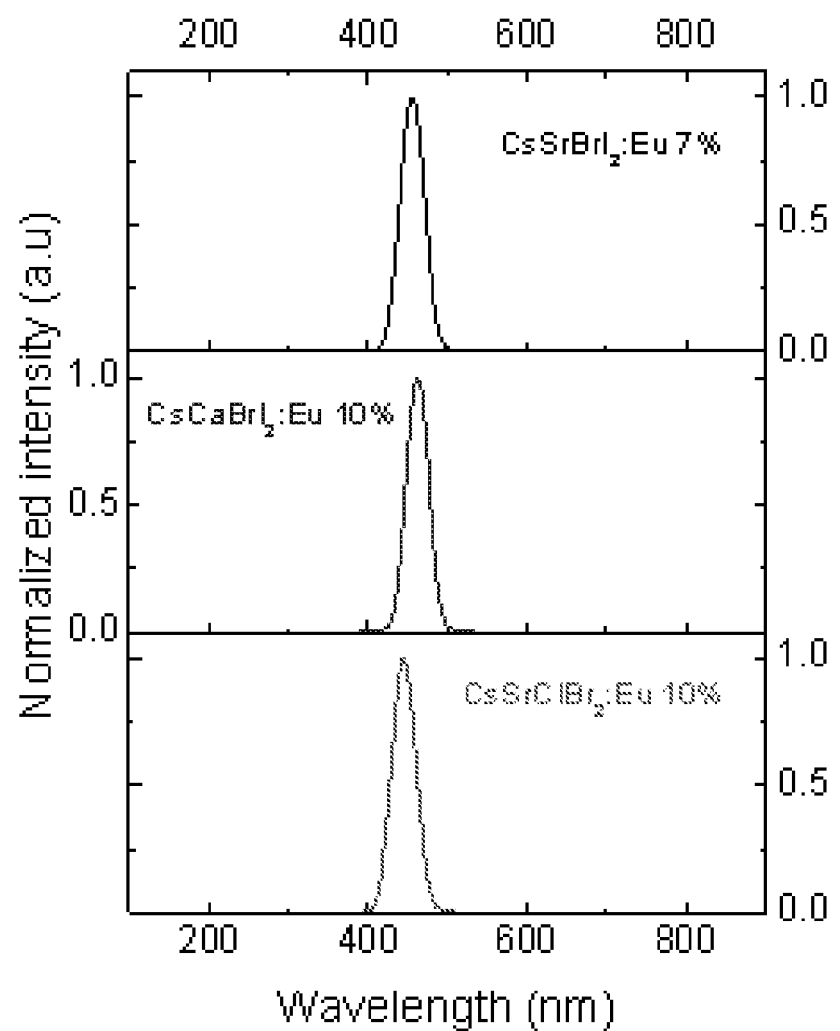
FIG. 5 illustrates the X-ray excited radioluminescence spectra of an exemplary $CsSrBrI_2$ (Eu 7%) scintillator, an exemplary $CsCaBrI_2$ (Eu 10%) scintillator, and an exemplary $CsSrClBr_2$ (Eu 10%) scintillator.

Radioluminescence spectra of exemplary scintillators were measured at room temperature under continuous irradiation from an X-ray generator model CMX003 (at 35 kV and 0.1 mA). A model PI Acton Spectra Pro SP-2155 monochromator was used to record the spectra. FIG. 5 illustrates the radioluminescence emission of several exemplary scintillators. These data show a single peak emission attributed to the characteristic emission of $Eu^{2+}$ 5d-4f transitions, which shows that $Eu^{2+}$ enters the lattice in divalent form. The energy of $Eu^{2+}$ 5d-4f excited states is described by P. Dorenbos in "Energy of the First $4f^2 \rightarrow 4f^65$ d Transition of $Eu^{2+}$ in Inorganic Compounds," *Journal of Luminescence,* 2003, 104, 239-260 and luminescence from this excited state is reported by D. H. Gahane, et al., in "Luminescence of $Eu^{2+}$ in Some Iodides," *Optical Materials,* 2009, 32, 18-21, and these disclosures are incorporated herein by reference.

As shown in the radioluminescence spectra presented in FIG. 5, an exemplary $CsSrBrI_2$ scintillator (Eu 7%) has a single peak centered at 455 nm; an exemplary $CsCaBrI_2$ (Eu 10%) scintillator has a single peak centered at 462 nm; and an exemplary $CsSrClBr_2$ scintillator (Eu 10%) has a single peak centered at 445 nm.

Figure 6:
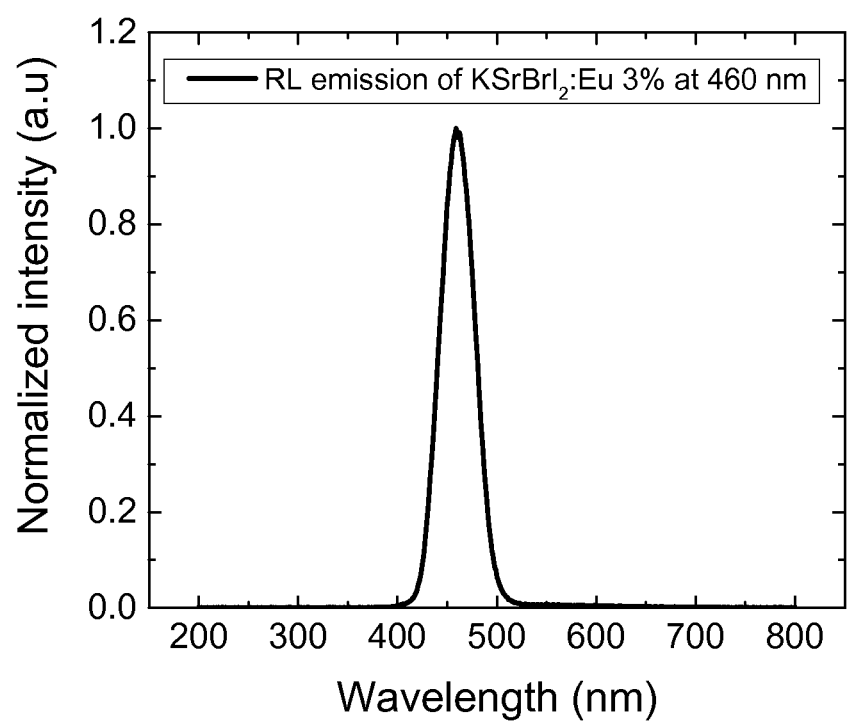
FIG. 6 illustrates the radioluminescence spectra of an exemplary $KSrBrI_2$ (Eu 3%) scintillator.
Figure 7:
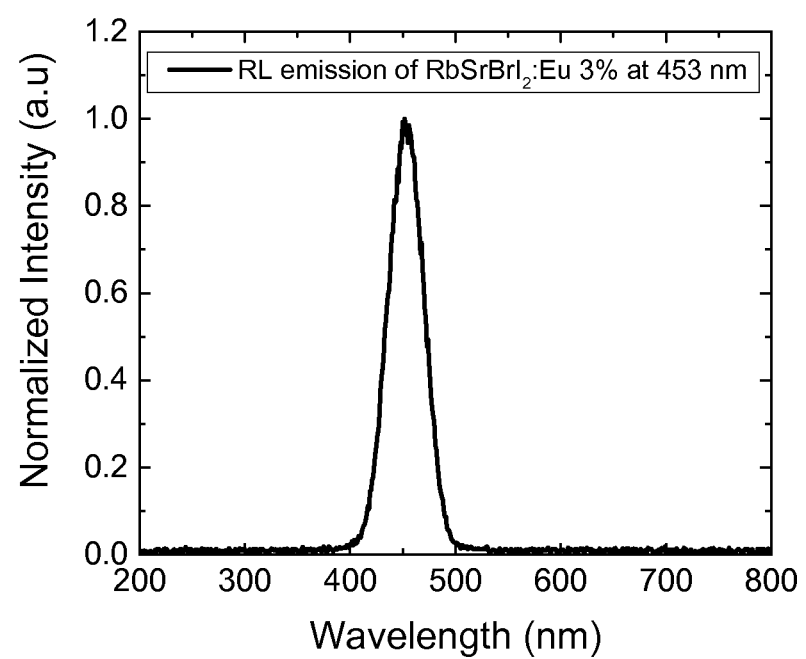
FIG. 7 illustrates the radioluminescence spectra of an exemplary $RbSrBrI_2$ (Eu 3%) scintillator.
Figure 8:
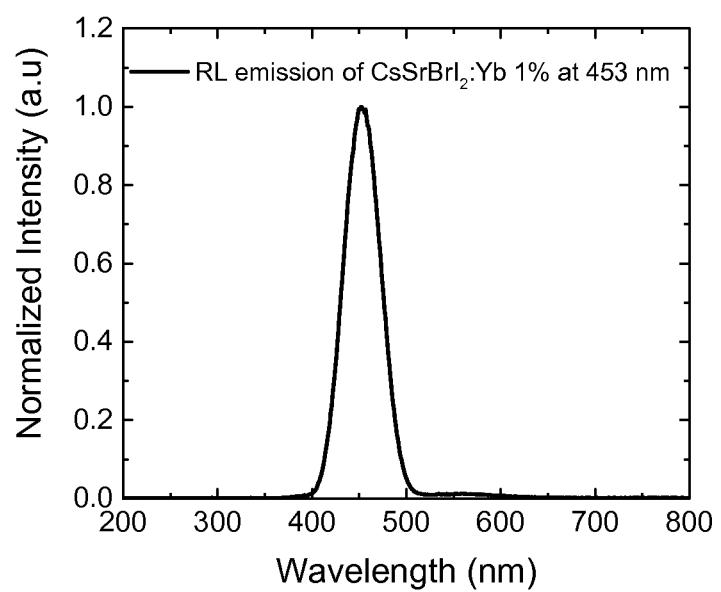
FIG. 8 illustrates the radioluminescence spectra of an exemplary $CsSrBrI_2$ (Yb 1%) scintillator.
Figure 9:
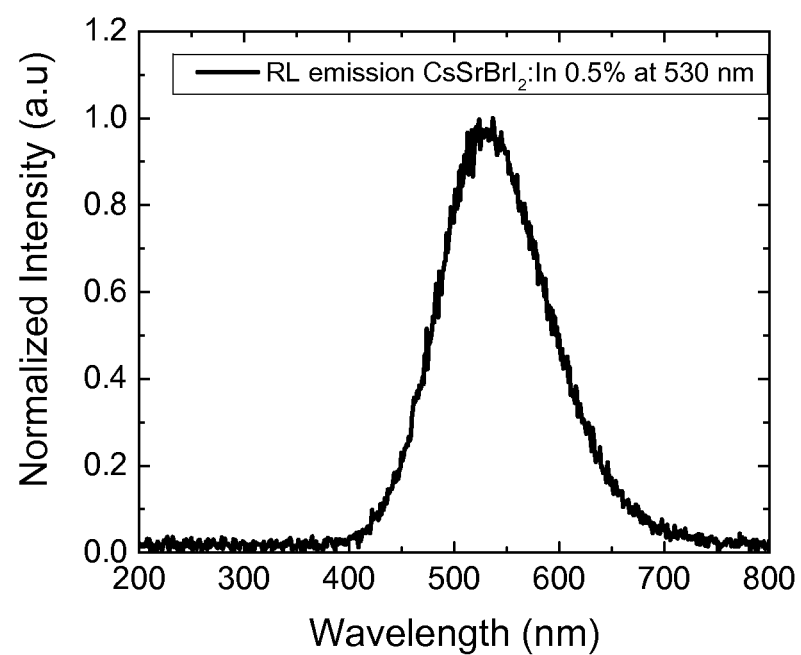
FIG. 9 illustrates the radioluminescence spectra of an exemplary $CsSrBrI_2$ (In 0.5%) scintillator.

FIGS. 6 to 9 present the radioluminescence spectra of additional exemplary scintillators. As shown in FIG. 6, an exemplary $KSrBrI_2$ (Eu 3%) scintillator has a single peak centered at 460 nm. An exemplary $RbSrBrI_2$ (Eu 3%) scintillator has a single peak centered at 453 nm, as shown in FIG. 7. FIG. 8 shows an exemplary $CsSrBrI_2$ (Yb 1%) scintillator having a single peak centered at 453 nm. FIG. 9 shows an exemplary $CsSrBrI_2$ (In 0.5%) scintillator having a single peak centered at 530 nm.

Scintillation Decay of Exemplary Scintillators

Scintillation decay time of exemplary scintillators was recorded using a $^{137}Cs$ source and the time-correlated single photon counting technique described by L. M. Bollinger, et al., in "Measurement of Time Dependence of Scintillation Intensity by a Delayed-Coincidence Method," *The Review of Scientific Instruments,* 1961, 32, 1044-1050, and this disclosure is incorporated herein by reference. Scintillation decay profiles of several exemplary scintillators are illustrated in FIGS. 10 to 13.

Figure 10:
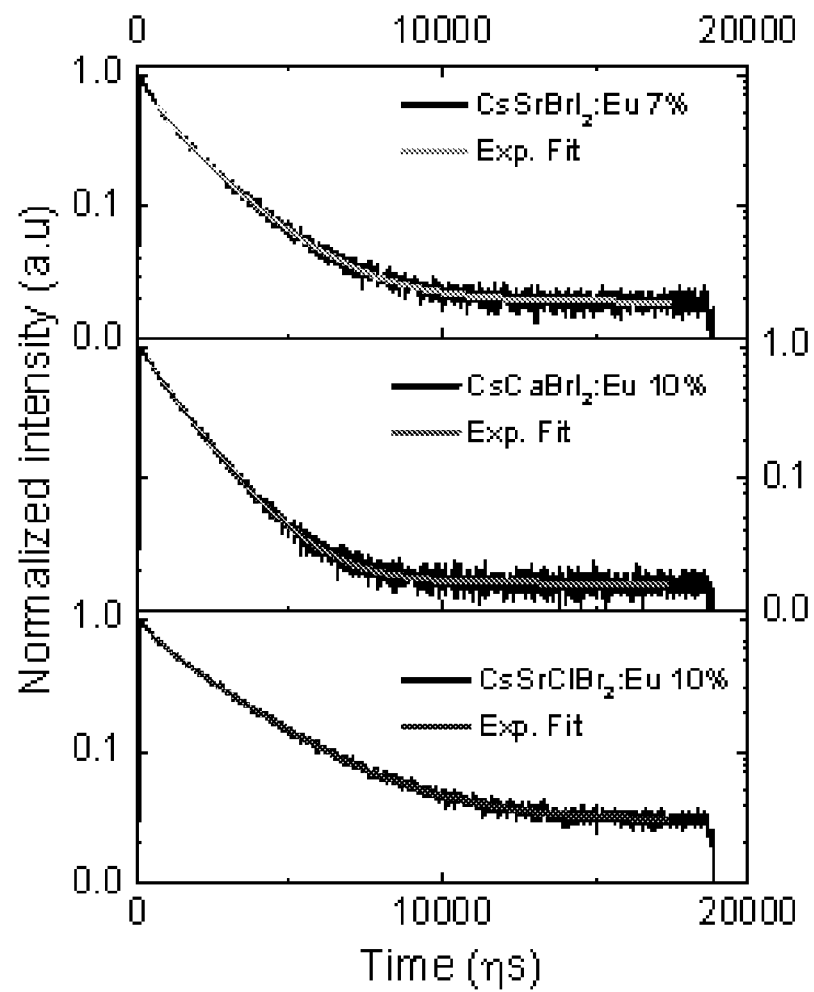
FIG. 10 illustrates the scintillation decay time profile of an exemplary $CsSrBrI_2$ (Eu 7%) scintillator, an exemplary $CsCaBrI_2$ (Eu 10%) scintillator, and an exemplary $CsSrClBr_2$ (Eu 10%) scintillator.

FIG. 10 shows the scintillation decay profile of an exemplary $CsSrBrI_2$ scintillator (Eu 7%), which has a primary decay component of 0.77 µs that accounts for ~89% of the total light output and the remaining light is collected over 3 µs; the scintillation decay profile of an exemplary $CsCaBrI_2$ scintillator (Eu 10%), which shows a double exponential decay response where the primary decay component of 1.2 µs accounts for ~82% of the total light output and the remaining light is collected over a longer component; and the scintillation decay profile of an exemplary $CsSrClBr_2$ scintillator (Eu 10%), which shows a double exponential decay response where the primary component is 2.5 µs and a faster component of 0.38 µs comprises about ~5% of the total light output. The scintillation decay curves presented in this figure were fitted with a two-component exponential decay function.

Figure 11:
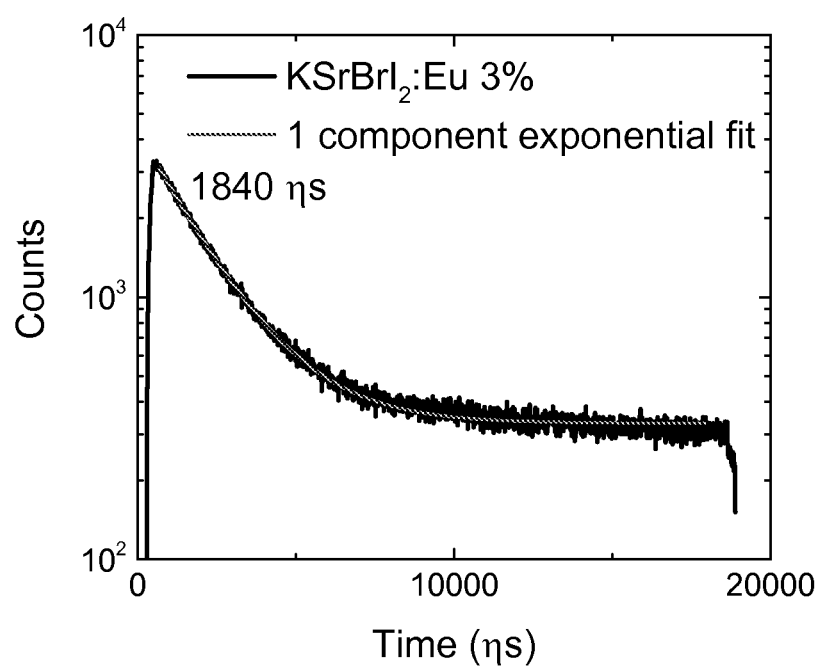
FIG. 11 illustrates the scintillation decay profile of an exemplary $KSrBrI_2$ (Eu 3%) scintillator.
Figure 12:
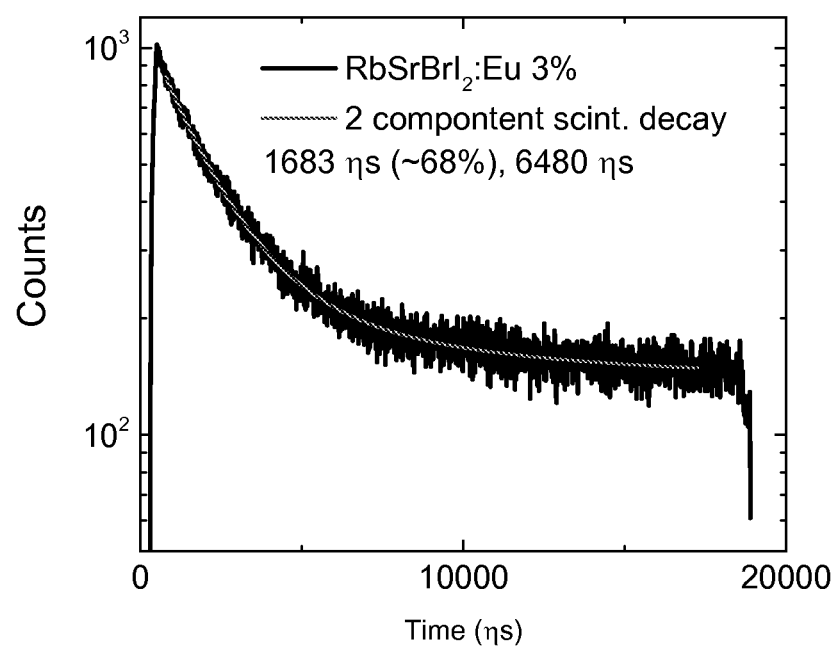
FIG. 12 illustrates the scintillation decay profile of an exemplary $RbSrBrI_2$ (Eu 3%) scintillator.
Figure 13:
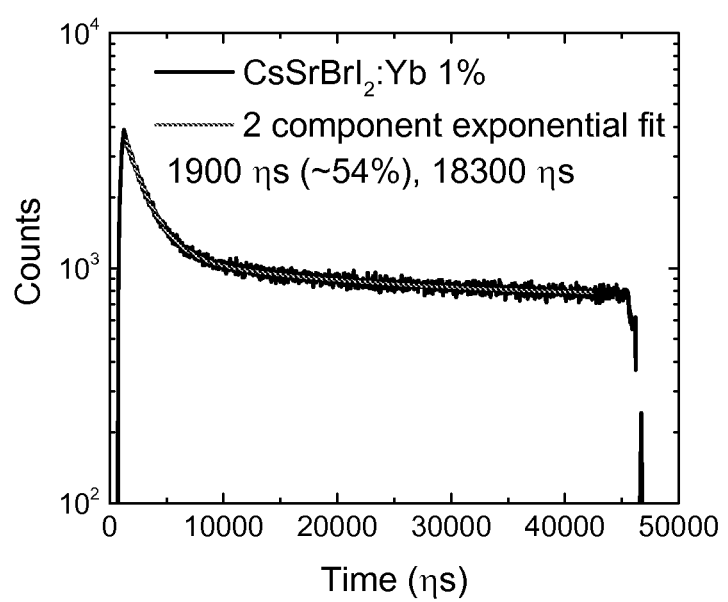
FIG. 13 illustrates the scintillation decay profile of an exemplary CsSrBrI$_2$ (Yb 1%) scintillator.

Decay profiles of additional exemplary scintillators are presented in FIGS. 11 to 13. FIG. 11 shows the scintillation decay profile of an exemplary $KSrBrI_2$ (Eu 3%) scintillator, fitted with a one-component exponential decay function. FIG. 12 shows the decay profile of an exemplary $RbSrBrI_2$ (Eu 3%) scintillator, fitted with a two-component exponential decay function. FIG. 13 shows the decay profile of an exemplary $CsSrBrI_2$ (Yb 1%) scintillator, fitted with a two-component exponential decay function.

Scintillation Light Yield of Exemplary Scintillators

Scintillation light yield of exemplary scintillators was measured using a Hamamatsu 3177-50 or R6231-100 photomultiplier tube ("PMT") and recording the response to gamma rays (from, e.g., a $^{137}$Cs (Cesium-137 isotope) source). Mineral oil was used to protect the sample scintillator crystal from degradation, as well as to provide an optical coupling between the sample scintillator crystal and the PMT such that scintillation light generated in the sample scintillator crystal would transmit to the PMT for measurement. The number of photoelectrons was calculated from the position of the 662 keV photopeak and the peak from single photoelectrons. The photopeaks were fitted with a Gaussian function to determine the center of the peak. The conversion from the number of measured photoelectrons to the number of photons/MeV emitted by the scintillator, i.e., the scintillator's light yield, was accomplished by convolving the quantum efficiency of the PMT as a function of wavelength (measured by Hamamatsu, the manufacturer of the PMT) with the X-ray excited emission spectrum of the sample. A hemispherical dome of Spectralon was used to improve the scintillation light collection into the PMT and a shaping time of 10 μs was used to ensure the complete integration of the light pulse. For the energy resolution and γ-ray response of $^{137}$Cs, $^{57}$Co, $^{109}$Cd, $^{133}$Ba and $^{241}$Am, the specimens were placed in a quartz container filled with mineral oil to protect them from moisture during the measurement.

Figure 14:
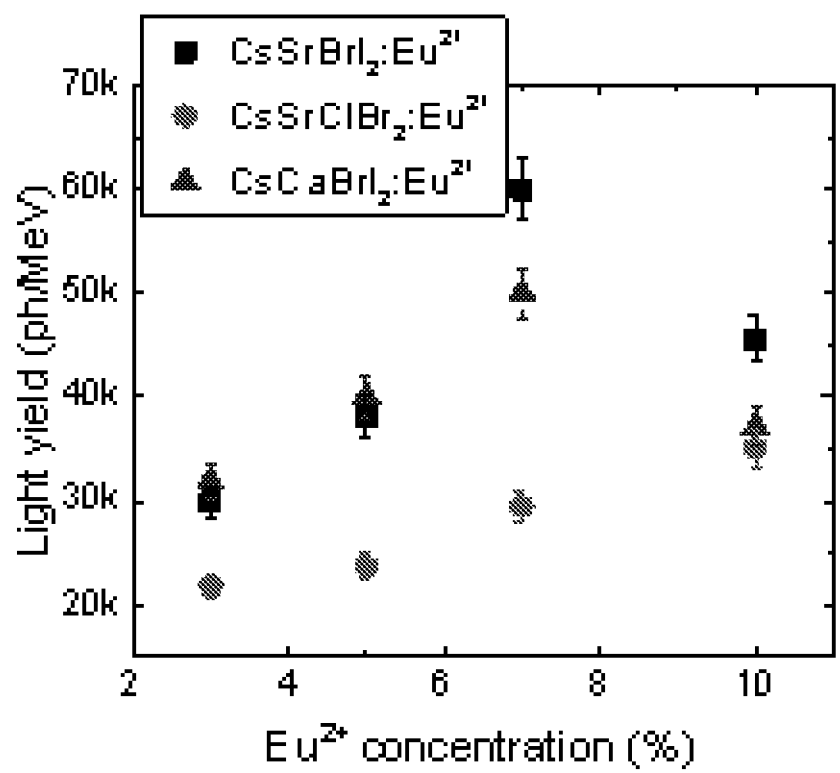
FIG. 14 illustrates the light yield as a function of europium concentration of an exemplary CsSrBrI$_2$ scintillator, an exemplary CsSrClBr$_2$ scintillator, and an exemplary CsCaBrI$_2$ scintillator.

FIG. 14 presents the light yield of exemplary scintillators as a function of europium concentration. For exemplary $CsSrBrI_2$ and $CsCaBrI_2$ scintillators, a europium concentration of 7% gave the highest light yield, 60,000 and 50,000 photons/MeV, respectively, as shown in FIG. 14. For an exemplary $CsSrClBr_2$ scintillator, a europium concentration of 10% gave the highest light yield, 35,000 photons/MeV.

Figure 15A:
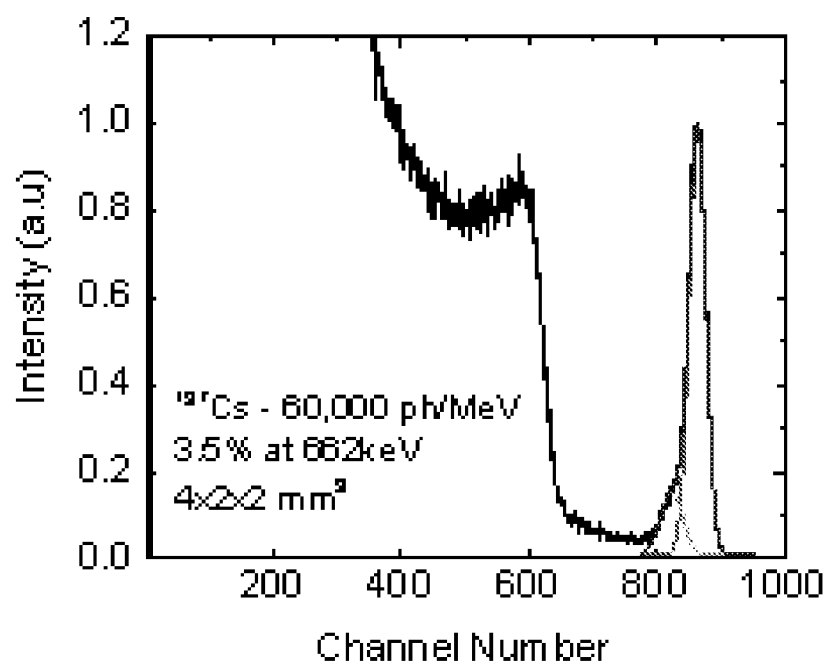
FIG. 15A illustrates the pulse height spectrum of an exemplary CsSrBrI$_2$ (Eu 7%) scintillator.
Figure 15B:
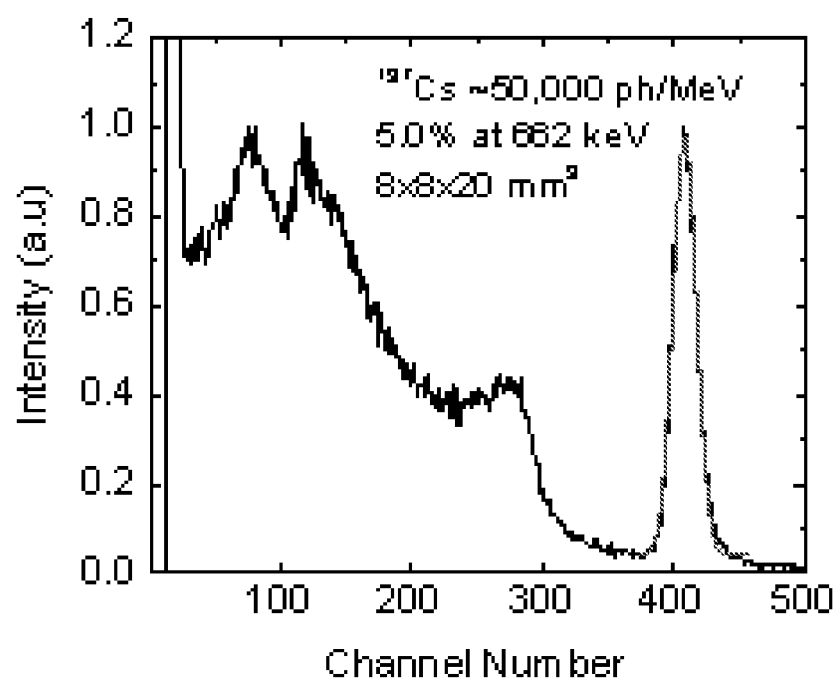
FIG. 15B illustrates the pulse height spectrum of an exemplary CsCaBrI$_2$ (Eu 7%) scintillator.
Figure 15C:
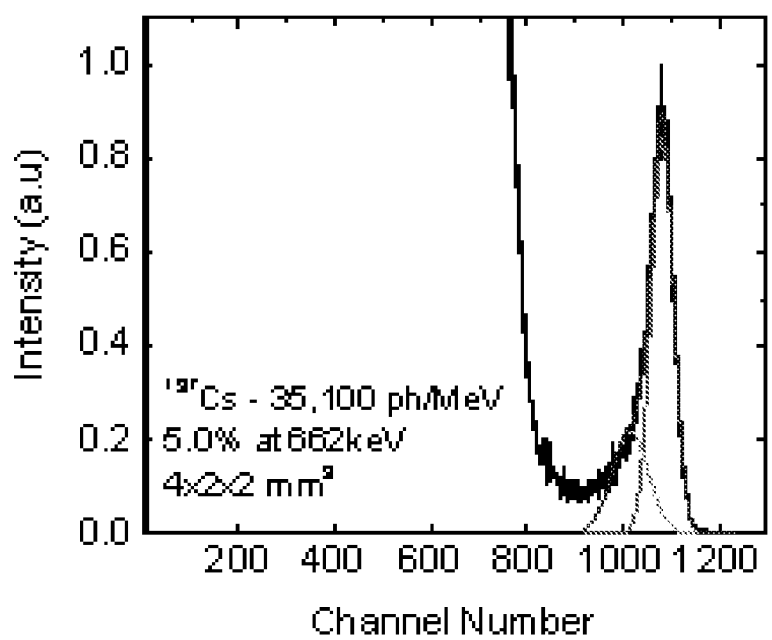
FIG. 15C illustrates the pulse height spectrum of an exemplary CsSrClBr$_2$ (Eu 10%) scintillator.
Figure 16:
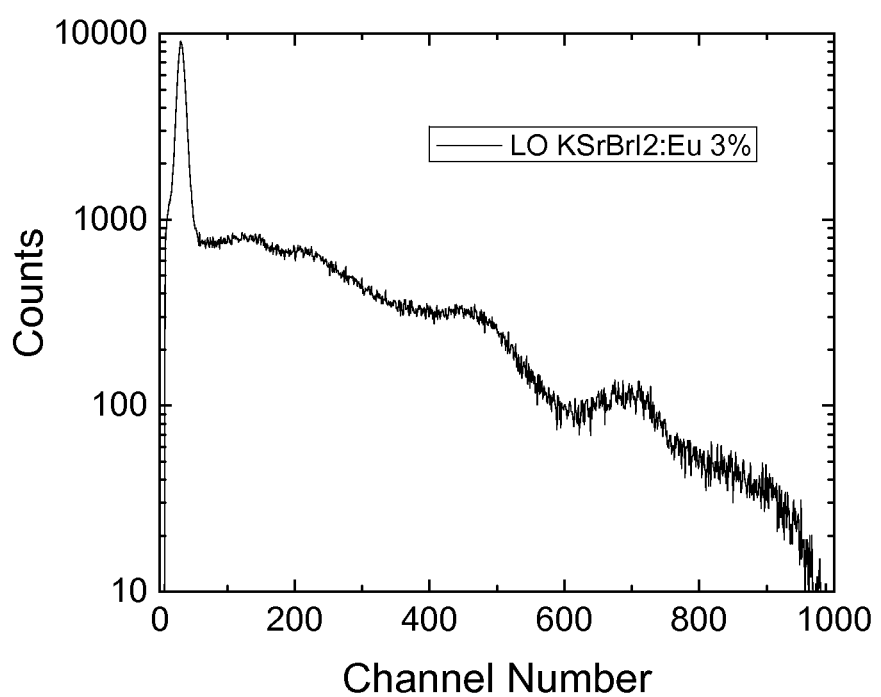
FIG. 16 illustrates the pulse height spectrum of an exemplary KSrBrI$_2$ (Eu 3%) scintillator.
Figure 17:
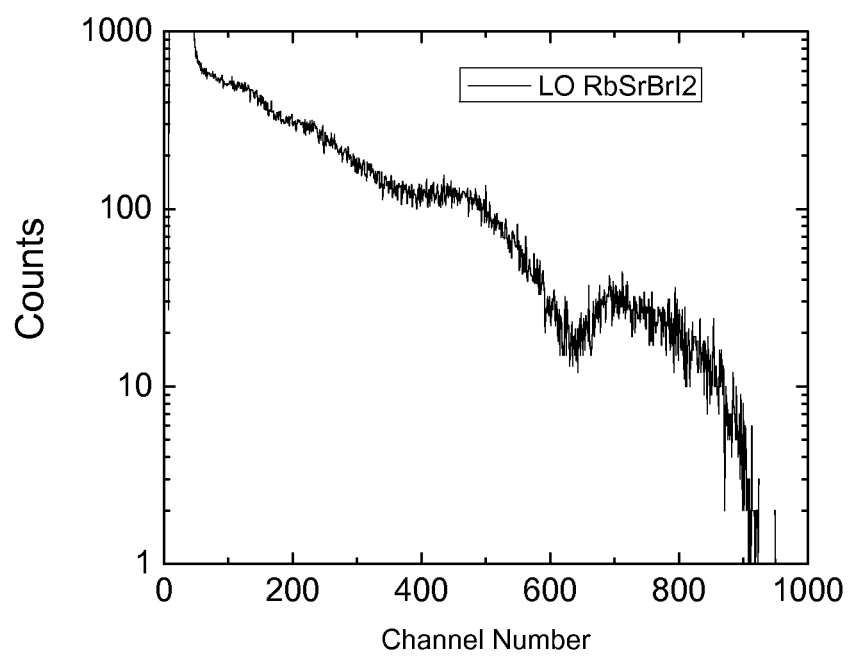
FIG. 17 illustrates the pulse height spectrum of an exemplary RbSrBrI$_2$ (Eu 3%) scintillator.

The pulse height spectra of exemplary scintillators are shown in FIGS. 15 to 17. The full-energy peak (photopeak) is fit by Gaussian function in FIGS. 15A to 15C. In FIG. 15A, the pulse height spectrum of an exemplary $CsSrBrI_2$ scintillator (Eu 7%) crystal (crystal dimensions: 4×2×2 mm$^3$) under $^{137}$Cs excitation is shown, and exhibits a light yield of 60,000 photons/MeV and energy resolution of 3.5% at 662 KeV. In FIG. 15B, the pulse height spectrum of an exemplary $CsCaBrI_2$ scintillator (Eu 7%) crystal (crystal dimensions: 8×8×20 mm$^3$) under $^{137}$Cs excitation is shown, and exhibits a light yield of 50,000 photons/MeV and energy resolution of 5.0% at 662 KeV. In FIG. 15C, the pulse height spectrum of an exemplary $CsSrClBr_2$ scintillator (Eu 10%) crystal (crystal dimensions: 4×2×2 mm$^3$) under $^{137}$Cs excitation is shown, and exhibits a light yield of 35,000 photons/MeV and energy resolution of 5.0% at 662 KeV.

FIGS. 16 and 17 illustrate pulse height spectra of additional exemplary scintillators, measured under $^{137}$Cs excitation. In FIG. 16, the pulse height spectrum of an exemplary $KSrBrI_2$ (Eu 3%) scintillator is shown, which exhibits a light yield of 36,500 photons/MeV. The pulse height spectrum of an exemplary $RbSrBrI_2$ (Eu 3%) scintillator is presented in FIG. 17, and the exemplary $RbSrBrI_2$ (Eu 3%) scintillator exhibits a light yield of 37,200 photons/MeV.

Figure 18:
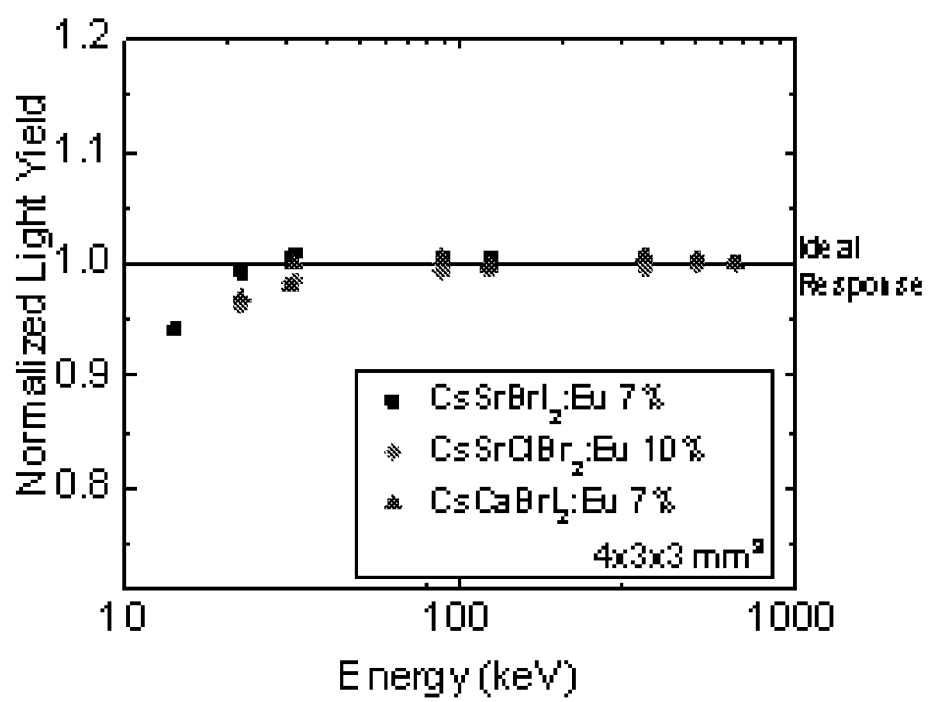
FIG. 18 illustrates the scintillation light yield per unit energy as a function of deposited gamma-ray energy of an exemplary CsSrBrI$_2$ (Eu 7%) scintillator, an exemplary CsCaBrI$_2$ (Eu 7%) scintillator, and an exemplary CsSrClBr$_2$ (Eu 10%) scintillator.

FIG. 18 presents the scintillation light yield per unit energy as a function of deposited γ-ray energy for several exemplary scintillator crystals. These data were obtained by irradiating exemplary scintillator crystals (crystal dimensions: 4×3×3 mm$^3$) with γ-ray excitation energies ranging from 14 to 662 KeV.

As shown in FIG. 18, an exemplary $CsSrBrI_2$ scintillator (Eu 7%) exhibits a proportional response from 20 to 662 keV and decreases by ~6% at 14 keV. Exemplary $CsCaBrI_2$ (Eu 7%) and $CsSrClBr_2$ (Eu 10%) scintillators begin to exhibit non-proportionality at higher energies. Notably, the response curves of the exemplary mixed-halide scintillators lack the well-known "halide hump", i.e., the often-observed increase in light yield at intermediate energies as described by S. A. Payne, et al., in "Nonproportionality of Scintillator Detectors: Theory and Experiment," *IEEE Transactions on Nuclear Science,* 2009, 56, 2506-2512 as well as in "Scintillator Light Yield Nonproportionality: Calculating Photon Response Using Measured Electron Response," *IEEE Transactions on Nuclear Science,* 1997, 44, 509-516, by B. D. Rooney et al., and the disclosure of each is incorporated herein by reference. Instead, the response curves of the exemplary scintillators are similar to the response commonly observed for oxide scintillators in which the light yield is constant for high and intermediate energies and then decreases monotonically at low energies.

Photoluminescence of Exemplary Scintillators

Figure 19:
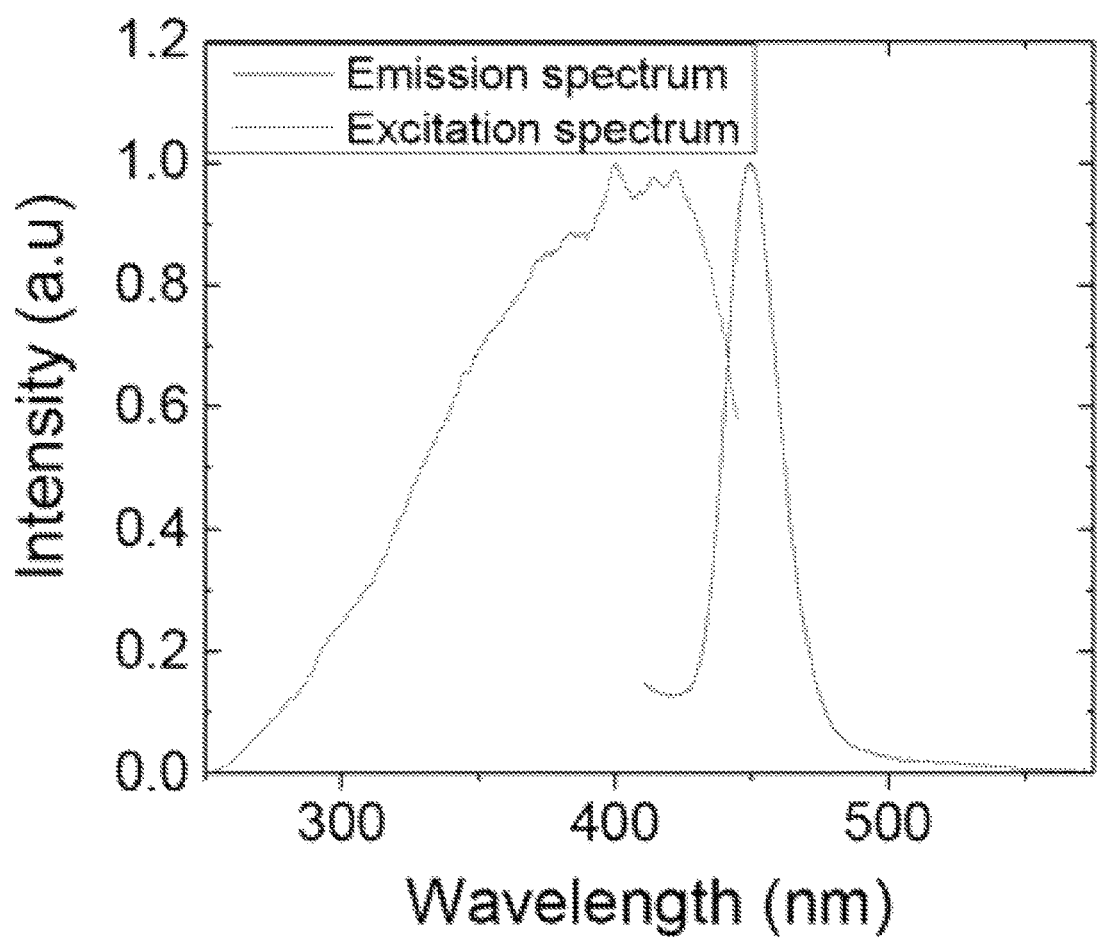
FIG. 19 illustrates the photoluminescence spectra of an exemplary CsSrBrI$_2$ (Eu 7%) scintillator.

FIG. 19 presents the photoluminescence spectral features of an exemplary $CsSrBrI_2$ scintillator (Eu 7%). These data were acquired using a Hitachi Fluorescence Spectrophotometer equipped with a Xenon lamp at room temperature. The spectral features illustrated in FIG. 19 involve 4f-5d excited states and are characteristic of divalent europium luminescence.

Partial Halide Substitution

Figure 20:
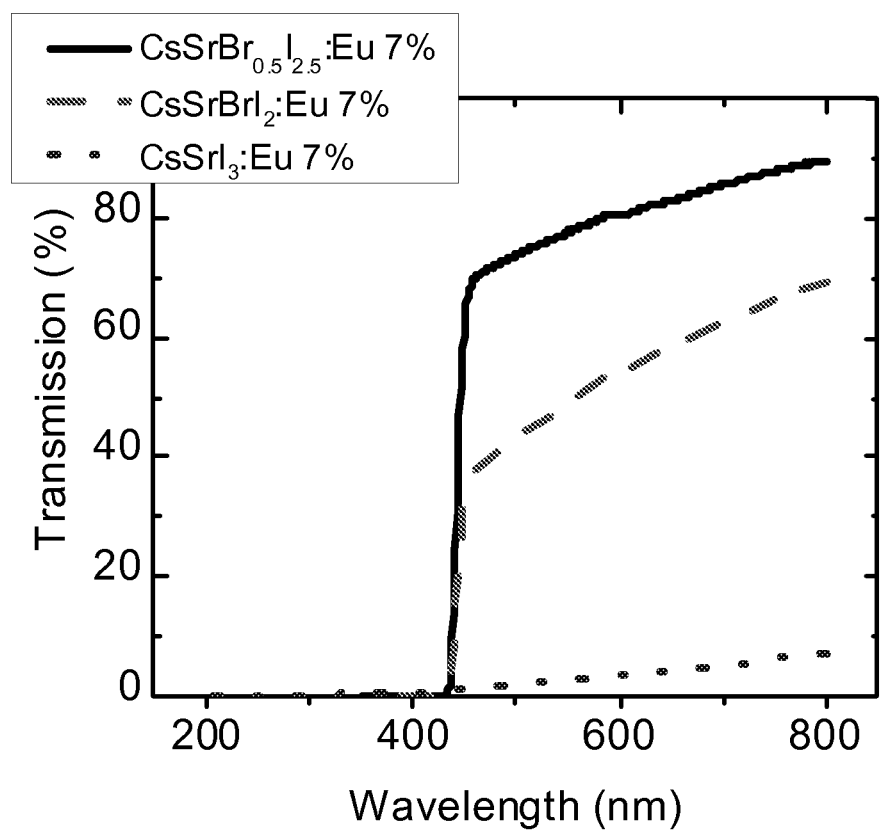
FIG. 20 illustrates the transmission of exemplary CsSrI$_3$ (Eu 7%), CsSrBrI$_2$ (Eu 7%), and CsSrBr$_{0.5}$I$_{2.5}$ (Eu 7%) scintillators.

Partial substitution of the halide components of formulas (1) and (2) may improve scintillator performance. For example, FIG. 20 illustrates the effect of partial halide substitution on the transmission of exemplary $CsSrI_3$ (Eu 7%), $CsSrBrI_2$ (Eu 7%), and $CsSrBr_{0.5}I_{2.5}$ (Eu 7%) scintillators. The samples of these exemplary scintillators used to measure this data were grown by the Bridgman technique with MAA mixing to 3 mm in thickness. A shown in FIG. 20, the transmission of the exemplary $CsSrI_3$ (Eu 7%) scintillator was improved by approximately 35% by the 33% iodide for bromide halide substitution in the exemplary $CsSrBrI_2$ (Eu 7%) scintillator, and by approximately 65% by the 16.6% iodide for bromide halide substitution in the exemplary $CsSrBr_{0.5}I_{2.5}$ (Eu 7%) scintillator.

Figure 21:
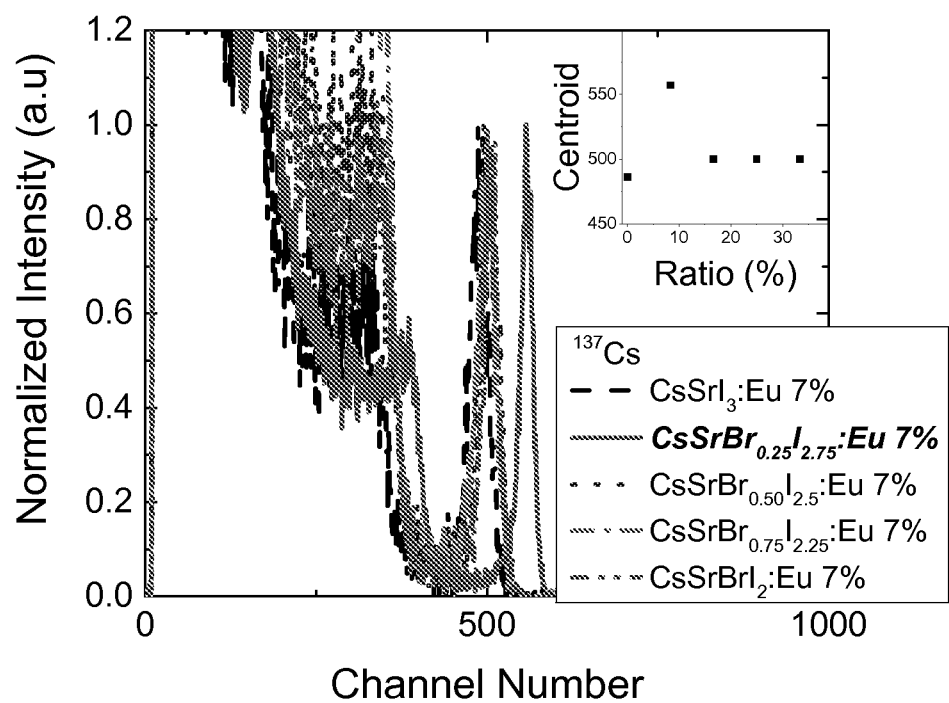
FIG. 21 illustrates the light yield of exemplary CsSrI$_3$ (Eu 7%), CsSrBr$_{0.25}$I$_{2.25}$ (Eu$^7$%), CsSrBr$_{0.5}$I$_{2.5}$ (Eu 7%), CsSrBr$_{0.25}$I$_{2.25}$ (Eu 7%), and CsSrBrI$_2$ (Eu 7%) scintillators.

The effect of partial halide substitution on light yield is illustrated in FIG. 21. Samples of exemplary $CsSrI_3$ (Eu 7%), $CsSrBr_{0.25}I_{2.75}$ (Eu 7%), $CsSrBr_{0.5}I_{2.5}$ (Eu 7%), $CsSrBr_{0.75}I_{2.25}$ (Eu 7%), and $CsSrBrI_2$ (Eu 7%) scintillators were melt-freeze synthesized with MAA mixing. As shown in this figure, the light yield of an exemplary $CsSrI_3$ (Eu 7%) scintillator was increased by substituting bromide for iodide, and the maximum light yield was obtained at 8.33% iodide for bromide substitution.

It shall be appreciated that the disclosure may be not limited to the described embodiments, and that any number of scenarios and embodiments in which conflicting appointments exist may be resolved.

Although the disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

The illustrations of the examples and embodiments described herein are intended to provide a general understanding of the various embodiments, and many other examples and embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be to be determined by the broadest permissible interpretation of the following claims and their equivalents, and shall not be restricted or limited by the foregoing detailed description.

We claim:

1. A scintillator comprising a chemical compound having the chemical formula $$A_{(1-y)}BM_yX'_wX''_{(3-w)},$$

wherein $0 \leq y \leq 1$, $0.05 \leq w \leq 1$,

A is one of Li, Na, K, Rb, Cs, In or any combination thereof,

B is Mg, Ca, Sr, Ba or any combination thereof,

M is In, Na or Tl, and

X' is one of F, Cl, Br, I or any combination thereof, and

X'' is different from X' and is one of F, Cl, Br, and I or any combination thereof.

2. The scintillator of claim 1, wherein $0 \leq y \leq 0.15$.

3. The scintillator of claim 1, wherein A is Cs.

* * * * *